United States Patent [19]

Shimpuku et al.

[11] Patent Number: 5,750,616
[45] Date of Patent: May 12, 1998

[54] FIBER-REINFORCED THERMOPLASTIC RESIN COMPOSITE MATERIAL

[75] Inventors: Takashi Shimpuku; Nobukazu Atsumi. both of Ichihara, Japan

[73] Assignee: Chisso Corporation, Osaka, Japan

[21] Appl. No.: 624,743

[22] Filed: Mar. 27, 1996

[30] Foreign Application Priority Data

Mar. 30, 1995 [JP] Japan ................. 7-097771

[51] Int. Cl.⁶ ................ C08J 5/10; C08K 3/04; C08L 23/14
[52] U.S. Cl. ............ 524/496; 524/492; 524/493; 524/494; 524/495; 524/420; 524/514; 524/513
[58] Field of Search ............... 524/492, 493, 524/494, 495, 496, 514, 513, 420, 434, 439, 413, 452, 914

[56] References Cited

U.S. PATENT DOCUMENTS

| | | | |
|---|---|---|---|
| 4,048,137 | 9/1977 | Heitmann | 260/42.15 |
| 4,943,607 | 7/1990 | Tanisake et al. | 523/500 |
| 5,004,561 | 4/1991 | Nomura et al. | 252/511 |
| 5,079,281 | 1/1992 | Takeuchi et al. | 523/212 |

FOREIGN PATENT DOCUMENTS

| | | |
|---|---|---|
| 0581367 | 2/1994 | European Pat. Off. |
| 0651003 | 5/1995 | European Pat. Off. |
| 2596403 | 10/1987 | France |
| 2150444 | 6/1990 | Japan |
| 4353536 | 12/1992 | Japan |

OTHER PUBLICATIONS

R. Bode, "Pigmentrusse für Kunststoffe", Kautschuk + Gummi Kunststoffe. vol. 30, No. 8, Aug. 1993, pp. 660–676.

*Primary Examiner*—Vasu Jagannathan
*Assistant Examiner*—U. K. Rajguru
*Attorney, Agent, or Firm*—Leydig, Voit & Mayer, Ltd.

[57] ABSTRACT

A fiber-reinforced thermoplastic resin composite material comprises a thermoplastic resin, 5 to 80% by weight of a fiber reinforcing material having an average diameter ranging from 3 to 21 μm and an average length ranging from 0.3 to 30 mm, and 0.01 to 5% by weight of carbon black whose aggregate size upon primary cohesion is not more than 60 nm. The composite material permits effective prevention of any snapping of glass fibers for reinforcement in molded articles which are colored black or gray due to the contribution of the carbon black having a specific aggregate size incorporated into the resin along with the fiber reinforcing material. Therefore, the composite material can provide molded articles excellent in mechanical strength, for instance, all of tensile strength, flexural strength and Izod impact strength.

12 Claims, No Drawings

FIBER-REINFORCED THERMOPLASTIC RESIN COMPOSITE MATERIAL

FIELD OF THE INVENTION

The present invention relates to a fiber-reinforced thermoplastic resin composite material comprising fibers and carbon black and more particularly to a colored fiber-reinforced thermoplastic resin composite material in which the fibers as a reinforcing material are hardly broken during molding due to the presence of specific carbon black and they can further be made unbreakable by addition of zinc sulfide to the composite.

BACKGROUND OF THE INVENTION

It is known that a resin such as a thermoplastic resin is converted into a fiber-reinforced resin by incorporating a fiber reinforcing material into the resin to markedly improve, for instance, the rigidity, flexural strength and tensile strength thereof. Among such fiber reinforcing materials, glass fibers have exclusively and commonly been used from the practical point of view. In addition, carbon black has been incorporated into a resin for the purpose of pigmenting the resin and improving it in resistance to ultraviolet rays.

However, when molding a resin comprising a glass fiber reinforcing material incorporated therein, the fibers are often broken or snapped (hereinafter comprehensively referred to as "damaged") into short pieces and the reinforcing effect thereof is impaired. The fibers would be more conspicuously damaged, particularly, when a longer fiber reinforcing material is used.

For instance, Japanese Patent L-O-P No. 150444(1990) proposes a gray-colored fiber-reinforced polypropylene resin composition which comprises a polymer mixture of a polypropylene and a polypropylene having carboxyl groups introduced therein as a resin component; a glass fiber reinforcing material treated with silane compound as a reinforcing fiber; two-component pigment comprising zinc sulfide and carbon black as a pigmenting component; and a polyethylene wax as a dispersant. This patent discloses that, when the composition is molded into a wheel cap, the resulting cap is improved in the strength (rigidity, impact resistance) due to the use of polyethylene wax as the dispersant. In such a reinforced resin composition, however, the carbon black used simply serves as a pigmenting agent, the composition cannot sufficiently protect the co-existing glass fibers from any damage and any satisfactory reinforcing effect cannot be expected. For this reason, the composition can only provide molded products having low mechanical strength such as tensile strength, flexural strength and Izod impact strength.

On the other hand, Japanese Patent L-O-P No. 353536 (1992) discloses a glass fiber-reinforced resin composition in which, into (A) a thermoplastic resin, (B) zinc sulfide and glass fibers having an average length ranging from 1 to 10 mm and an average fiber diameter ranging from 3 to 20 µm are added in order to keep glass fibers present in the resulting molded product comprising the whitening agent and the glass fibers long. Moreover, the resin composition permits the improvement in long-term performance of the resulting molded product through addition of a cobalt salt. In this glass fiber-reinforced resin composition, however, the zinc sulfide is used as a whitening agent for adjusting the color tone of the resulting molded product and is especially selected because it does not damage the glass fibers.

More specifically, this reference discloses that titanium oxide conventionally used as a whitening agent is apt to impair and damage fiber reinforcing materials, while zinc sulfide may not cause any damage of fiber reinforcing material.

However, such a glass fiber-reinforced resin composition suffers from a problem such that it cannot reduce the damage of glass fibers to a practically acceptable level and that it can only provide molded products having low mechanical strength.

The inventors of this invention have conducted various studies, while taking into consideration the foregoing conventional techniques. As a result, the inventors noticed the importance of carbon black, finding that any damage of fiber reinforcing materials can be eliminated by the use of carbon black having specific properties in combination with a fiber reinforcing material (such as glass fibers) and that various pigmenting agents, for instance, titanium oxide and zinc sulfide, particularly preferably zinc sulfide can simultaneously be used, and have made a wider and deeper study of a fiber-reinforced resin composition to complete the present invention.

PURPOSE OF THE INVENTION

The present invention has been developed to solve the foregoing problems associated with the conventional techniques and accordingly, it is an object of the present invention to provide a fiber-reinforced thermoplastic resin composite material which can prevent any damage to the surface of glass fibers even when employing titanium oxide as a white pigment whose surface hardness is high, which permits the production of a molded product in which the fibrous component has a length approximately equal to the original length thereof and which consequently has further improved mechanical strength and physical strength.

SUMMARY OF THE INVENTION

The fiber-reinforced thermoplastic resin composite material according to the present invention comprises a thermoplastic resin; and dispersed in the thermoplastic resin 5 to 80% by weight of a fiber reinforcing material having an average diameter ranging from 3 to 21 µm and an average length ranging from 0.3 to 30 mm and 0.01 to 5% by weight of carbon black having an aggregate size upon primary cohesion of not more than 60 nm, preferably not more than 55 nm.

In the composite material of the present invention, the fiber reinforcing material may be produced by forming an inorganic substance into a fiber and examples of such inorganic substances include glass, quartz, naturally-occurring minerals, metals and carbon. These inorganic substances may be used alone or in any combination.

The foregoing fiber reinforcing material may likewise be produced by forming an organic substance into a fiber and examples of such organic substances are polyamide resins, polyester resins, aramid resins and polyimide resins. These organic substances may be used alone or in any combination.

The carbon black preferably has an average particle size (average diameter of unit carbon particles which form a structure) ranging from 13 to 24 nm.

Moreover, the fiber-reinforced thermoplastic composite material may further comprise 0.45 to 2.0% by weight of zinc sulfide in addition to the foregoing thermoplastic resin, fiber reinforcing material and carbon black.

SPECIFIC EXPLANATION OF THE INVENTION

The fiber-reinforced thermoplastic resin composite material of the present invention contains a thermoplastic resin with a fiber reinforcing material and a carbon black having specific properties, which are incorporated into the resin in a highly dispersed state.

Examples of the thermoplastic resins used for forming the composite material of the present invention include polyolefin resins such as polyethylene and polypropylene; polyamides such as polyamide-6 (nylon-6), polyamide-6,6 (nylon-6,6), polyamide-6,10 (nylon-6,10), polyamide-6,12 (nylon-6,12), polyamide-11 (nylon-11), polyamide-12 (nylon-12) and polyamide-MXD6 (nylon-MXD6); acrylic (co)polymers such as acrylonitrile-styrene copolymer; polyalkylene terephthalates such as polyethylene terephthalate; and polycarbonates. These resins may be used alone or in any combination. For instance, different kinds of resins are mixed to give a resin composition such as a resin composition comprising polyamide-6 and polypropylene and the resulting resin composition may be used as the thermoplastic resin component.

The thermoplastic resin used in the present invention preferably has crystallizability and all of polyamide-6, polypropylene and a resin composition consisting of polyamide-6 and polypropylene which are preferably used in the invention have crystallizability.

In addition, the thermoplastic resin used in the invention may be a modified product. For instance, when using a polypropylene as the thermoplastic resin, it is possible to use a product prepared by modifying polypropylene with a dicarboxylic acid, such as maleic acid, or an anhydride thereof (such as maleic anhydride).

When such a modified product is used in the invention, it is desirable that the rate of modification of the modified product used, for instance, the rate of grafting of the modification of polypropylene with maleic acid usually ranges from about 1 to 10%.

Either inorganic fiber reinforcing materials or organic fiber reinforcing materials may be used as the fiber reinforcing materials to be dispersed in the foregoing thermoplastic resins.

As inorganic fiber reinforcing materials usable herein, there may be listed, for instance, fibers formed from glass such as hard glass fibers; fibers formed from quartz such as molten quartz fibers; fibers derived from naturally-occurring minerals such as rock wool; fibers formed from metals; and fibers formed from carbon. The foregoing inorganic fibers may be used alone or in combination. It is also possible to use fibers obtained by forming any combination of the foregoing inorganic materials into fibers.

Desirably, the inorganic fiber reinforcing material used in the invention in general has an average diameter ranging from 3 to 21 µm, preferably 9 to 17 µm and an average length usually ranging from 0.3 to 30 mm and preferably 0.5 to 10 mm.

As the organic fiber reinforcing materials usable herein, there may be listed, for instance, fibers formed from polyamide resins, in particular, those prepared from complete aromatic fibers such as Aramid and Kevler (trade name); and fibers formed from polyester resins, in particular, those formed from complete aromatic fibers and polyimide resins. The foregoing organic fibers may be used alone or in combination. Moreover, it is also possible to use fibers formed from a resin composition comprising the foregoing organic resins used as the ingredients for the foregoing organic fibers.

If using such an organic fiber reinforcing material, the organic fiber reinforcing material should be selected in such a manner that the resin from which the reinforcing material is formed has a melting point (or thermal decomposition temperature) higher than that of the thermoplastic resin to be blended with the reinforcing material in order to prevent any damage to the shape of the organic reinforcing material present in the fiber-reinforced thermoplastic resin composite material of the invention.

It is desirable that such an organic fiber reinforcing material have an average diameter usually ranging from 6 to 16 µm, preferably 9 to 12 µm and an average length usually ranging from 0.3 to 30 mm, preferably 0.5 to 10 mm.

The composite material of the present invention may also comprise any combination of the foregoing inorganic fibers and organic fibers as the fiber reinforcing material.

In the present invention, the content of such a fiber reinforcing material in general ranges from 5 to 80% by weight, preferably 10 to 50% by weight and more preferably 15 to 40% by weight.

The carbon black used in the invention is not one in which the basic particles of carbon exist in the form of unit particles, but forms the so-called structure. In this respect, the term "structure" means primary particles cohered aggregates formed by fusing basic particles of carbon to each other, and are distinguished from secondary particles cohered agglomerates formed from the primary cohered particles, which are formed through van der Waals forces.

The carbon black used herein has a length of the structure (aggregate size) of not more than 60 nm, preferably not more than 55 nm, on the average.

It is also desirable that the carbon black used herein have an average particle size usually ranging from 13 to 24 nm, preferably 10 to 20 nm. In the present invention, the content of the carbon black is selected so as to fall within the range of from 0.01 to 5% by weight on the basis of the weight of the foregoing composite material.

The fiber-reinforced thermoplastic resin composite material of the present invention may further comprise other coloring pigments, particularly preferably zinc sulfide in addition to the aforementioned thermoplastic resin, fiber reinforcing material and carbon black.

For instance, zinc sulfide is used in an amount generally ranging from 0.45 to 2% by weight on the basis of the weight of the composite material, but the amount thereof may be arbitrarily determined in proportion to the desired degree of coloring of the resulting composite material.

The fiber-reinforced thermoplastic resin composite material according to the present invention can be prepared by mixing the aforementioned fiber reinforcing material, carbon black and thermoplastic resin, such as those discussed above, and optionally (or according to need) a pigment such as titanium oxide, zinc sulfide, lithophone, zinc oxide and antimony oxide, in particular, zinc sulfide, and then kneading the resulting mixture.

In the preparation of the composite material, the continuous fibers are preferably treated with a small amount of a thermoplastic resin in advance to form a continuous fiber master batch before the practical use thereof. Such a continuous fiber master batch is, for instance, prepared by the following method.

If polypropylene is, for instance, used as the thermoplastic resin, a modified polypropylene is first prepared by mixing un-modified polypropylene with a modifier such as maleic anhydride and a reaction initiator as well as an optional lubricant (for instance, a metal salt of a higher fatty acid such as calcium stearate) and then melting and kneading the resulting mixture. Thereafter, continuous fibers are introduced into the modified polypropylene while heating the modified polypropylene, so that it is maintained in its molten state, to thus impregnate the continuous fibers with the modified polypropylene. In this respect, the modified polypropylene and the continuous fibers may be blended in any compounding ratio.

Moreover, it is preferred in the present invention that a master batch comprising the thermoplastic resin and specific carbon black and optional zinc sulfide dispersed in the resin be first prepared by kneading these ingredients together and that the composite material be then prepared using the pigment master batch thus obtained.

The pigment master batch may be prepared by blending a thermoplastic resin, preferably that used for preparing the composite material of the present invention with at least part of the specific carbon black and optionally blending with at least part of the zinc sulfide if it is used and then kneading the resulting blend. In this case, the total amount of the pigments (i.e., sum of the amounts of carbon black and zinc sulfide) and the amount of the thermoplastic resin may be arbitrarily selected, but the ratio of the amount of the resin to that of the pigments desirably ranges from 95/5 to 20/80 and preferably 80/20 to 50/50. The selection of the ratio which falls within the range defined above permits sufficient kneading of the pigments and the resin. In this regard, carbon black or the like is not necessarily used in the form of a master batch, as explained above, and the composite material of the invention may likewise be prepared by blending the resin with a part of, carbon black as a master batch and the rest of, carbon black as it is, and then kneading and molding the resulting blend.

In addition, the fiber-reinforced thermoplastic resin composite material of the invention may further comprise a dispersant, a heat stabilizer and/or weathering agent in such amounts that they do not impair the desired characteristic properties of the composite material of the invention.

EFFECTS OF THE INVENTION

According to the fiber-reinforced thermoplastic resin composite material of the present invention, the molded product formed from the composite material shows various effects detailed below due to the contribution of the carbon black having a specific aggregate size, which is used simultaneously with a fiber reinforcing material.

The composite material permits effective prevention of any snapping of glass fibers for reinforcement present in molded products which are colored black or gray. Therefore, the composite material can provide a molded product having high retention rates of mechanical strength, for instance, all of tensile strength, flexural strength and Izod impact strength.

EXAMPLES

In the following Examples and Comparative Examples, the quality of the carbon black, the quality and physical properties of the resulting test pieces and the like were determined by the following test methods (1) to (6):

(1) Average Aggregate Size (upon primary cohesion)

This is determined on the basis of images on a transmission electron micrograph;

(2) Average Particle Size

This is determined on the basis of images on a transmission electron micrograph;

(3) Dispersibility

Carbon black is kneaded with a resin, followed by press-molding the blend into a thin film, observing the thin film with a microscope to visually evaluate the dispersibility and rating the results according to the following criteria:

○: Good Dispersibility,

X: Unacceptable Dispersibility;

(4) Tensile Strength-Retention Rate

The tensile strength of each test piece was determined according to JIS K7113. Each measured value was converted into a value relative to that observed for the test piece, free of any pigment, which was assumed to be "100", and the resulting relative value was defined to be "tensile strength-retention rate".

(5) Flexural Strength-Retention Rate

The flexural strength of each test piece was determined according to JIS K7203. Each measured value was converted into a value relative to that observed for the test piece, free of any pigment which was assumed to be "100", and the resulting relative value was defined to be "flexural strength-retention rate".

(6) Notched Izod Impact Strength-Retention Rate

The notched Izod impact strength of each test piece was determined according to JIS K7110. Each measured value was converted into a value relative to that observed for the test piece, free of any pigment, which was assumed to be "100", and the resulting relative value was defined to be "notched Izod impact strength-retention rate".

Each "retention rate" in the foregoing test (4), (5) or (6) is calculated by the following formula:
Retention Rate (%)=(Physical Properties of Test Piece Comprising Pigments)/(Those of Test Piece Free of Pigments)× 100 (%)

In the following Examples and Comparative Examples, master batches (MB) used for preparing composite materials (test pieces) were prepared by the method detailed below.

<Method for Preparing Pigment MB>

Polypropylene [MFR (230° C.; 2.16 kgf): 3 g/10 min] was dry-blended with carbon black and zinc sulfide (ZnS) or titanium oxide ($TiO_2$) listed in the following Table 1 in amounts specified in Table 1 and then the resulting blend was kneaded in a twin-screw extruder to give each pigment MB.

TABLE 1

| Pigment MB No. | Resin Kind | Resin Amount (wt %) | Carbon Black Brand | Carbon Black Average Aggregate Size (nm) | Carbon Black Amount (wt %) | Amount of ZnS (wt %) | Amount of $TiO_2$ (wt %) |
| --- | --- | --- | --- | --- | --- | --- | --- |
| MB-1 | PP | 75 | #900 | 44 | 25 | — | — |
| MB-2 | PP | 75 | #45L | 50 | 25 | — | — |
| MB-3 | PP | 75 | #45 | 58 | 25 | — | — |
| MB-4 | PP | 75 | #40 | 78 | 25 | — | — |
| MB-5 | PP | 75 | #10 | 248 | 25 | — | — |
| MB-6 | PP | 75 | MCF88 | 46 | 25 | — | — |
| MB-7 | PP | 75 | MCF88 | 46 | 25 | — | — |
| MB-8 | PP | 50 | #900 | 44 | 5 | 45 | — |
| MB-9 | PP | 50 | #40 | 78 | 5 | 45 | — |
| MB-10 | PP | 50 | #900 | 44 | 5 | — | 45 |
| MB-11 | PP | 50 | #40 | 78 | 5 | — | 45 |
| MB-12 | PP | 50 | #900 | 44 | 50 | — | — |

<Method for Preparing Glass Fiber MB>

There were mixed, in a Henschel Mixer (trade name) with stirring, resin ingredients, i.e., 99.20% by weight of unmodified polypropylene powder, 0.5% by weight of maleic anhydride as an unsaturated acid (modifier), 0.1% by weight of 1,3-bis(t-butyl peroxyisopropyl)benzene as an organic peroxide, a small amount of an antioxidant (i.e., 0.1% by weight of 2,6-di-t-butyl-p-cresol), and 0.1% by weight of calcium stearate as a lubricant. The mixture of these resin ingredients was fed to an extruder through the feed opening thereof, followed by melting and kneading it at a temperature of 200° C. and then pelletizing it through extrusion. The resulting modified polypropylene had an MFR (230° C.; 2.16 kgf) of 130 g/10 min and a rate of grafting with the modifier of 0.3%.

The mixture of the resin ingredients was fed to an extruder through the feed opening thereof at a constant feed rate to knead the mixture in the molten state while sucking through a vent and then extruding the molten mixture through a glass fiber-impregnation device fitted to the downstream end of the extruder barrel in such a manner that a composite material having a glass fiber content of 80% by weight could be extruded.

The impregnation device is a device for preparing continuous fiber-reinforced strands by sufficiently impregnating, with the molten resin introduced into the device at the upstream side thereof as a resin stream, glass rovings introduced into the device through a raw fabric thereof likewise fitted to the upstream side of the device in which the glass rovings are loosed into single fibers or fibers between which the molten resin enters.

The glass roving herein used was that for polypropylene having an average fiber diameter of 17 µm, a bundled filament number of 4000 and a tex number of 2310. The extruded strand was cooled to ordinary temperature by dipping it in a cooling bath containing water, followed by cutting the strands into pieces (average length: 6 mm) using a strand cutter to give a glass fiber MB.

Examples 1 to 6

The glass fiber MB, the pigment MB and un-modified polypropylene (PP) were dry-blended in amounts listed in Table 2 and each blend thus obtained was introduced into an injection molder to thus prepare a test piece of each corresponding reinforced composite material.

More specifically, each test piece was prepared under the same production conditions except that there were used carbon black (#900: Pigment MB No. 1 and 12) having an average aggregate size upon primary cohesion of 44 nm in Examples 1, 4 and 5; carbon black (#45L: Pigment MB No. 2) having an average aggregate size upon primary cohesion of 50 nm in Example 2; carbon black (#45: Pigment MB No. 3) having an average aggregate size upon primary cohesion of 58 nm in Example 3; or carbon black (MCF88: Pigment MB No. 6) having an average aggregate size upon primary cohesion of 46 nm in Example 6.

After conditioning (23° C.×48 hr) each test piece thus produced, physical properties thereof were measured. The results thus obtained are summarized in Table 2.

Comparative Examples 1 to 4

The same procedures used in Example 1 were repeated to form pellets and test pieces except that the pigment MB's specified in Table 2 were substituted for that used in Example 1 and that the thermoplastic resins and the pigment MB's were used in amounts listed in Table 2.

More specifically, there were used carbon black (#40: Pigment MB No. 4) having an average aggregate size upon primary cohesion of 78 nm in Comparative Example 1; carbon black (#10: Pigment MB No. 5) having an average aggregate size upon primary cohesion of 248 nm in Comparative Example 2; carbon black (#900: Pigment MB No. 1 or 12) having an average aggregate size upon primary cohesion of 44 nm in Comparative Example 3; and carbon black (MCF88: Pigment MB No. 7) having an average aggregate size upon primary cohesion of 46 nm in Comparative Example 4.

In this respect, the carbon black was insufficiently dispersed in the molded product prepared in Comparative Example 3 since the carbon black was added in a high concentration and a pigment MB which underwent secondary cohesion due to low dispersibility of the pigment in the MB was used in Comparative Example 4.

After conditioning (23° C.×48 hr) each test piece thus produced, physical properties thereof were measured. The results thus obtained are summarized in Table 2.

Example 7

There were mixed, in a "Henschel Mixer"(trade name) with stirring, resin ingredients, i.e., 99.2% by weight of un-modified polypropylene powder, 0.5% by weight of maleic anhydride as an unsaturated acid (modifier), 0.1% by weight of 1,3-bis(t-butyl peroxyisopropyl)benzene as an organic peroxide, 0.1% by weight of 2,6-di-t-butyl-p-cresol as an antioxidant and 0.1% by weight of calcium stearate as a lubricant. The mixture of these resin ingredients was fed to an extruder through the feed opening thereof, followed by melting and kneading it (temperature: 200° C.), and extruding and pelletizing it to give modified polypropylene pellets [MFR (230° C.; 2.16 kgf): 130 g/10 min]. The resulting modified polypropylene had a rate of grafting with the modifier of 0.3%.

Then there were introduced, into another extruder, the foregoing modified pellets through a first feed opening (positioned on the upstream side of the extruder), carbon black (#900) having an aggregate size upon primary cohesion of 44 nm through a second feed opening (positioned at the center of the extruder) and glass chopped strands (average length: 13 mm) through a third feed opening (positioned on the downstream side), in amounts specified in Table 2 respectively, followed by melting and kneading them while sucking through a vent, and then extruding the resulting blend to give strands.

The resulting continuous fiber-reinforced strand was cooled to ordinary temperature by dipping it in a cooling bath containing water, followed by cutting the strands into pieces using a strand cutter to give long fiber-reinforced pellets (average length: 6 mm).

Test pieces were produced from the reinforced pellets using an injection molder.

After conditioning these test pieces in the same manner used in Example 1, physical properties thereof were measured. The results thus obtained are summarized in Table 2.

Comparative Example 5

The same procedures used in Example 7 were repeated except that carbon black (#40: Pigment MB No. 9 or 10) having an average aggregate size upon primary cohesion of 78 nm was substituted for the carbon black used in Example 7 to form test pieces.

After conditioning the resulting test pieces in the same manner used in Example 1, physical properties thereof were measured. The results thus obtained are summarized in Table 2.

TABLE 2

Components and Quality of Glass Fiber-Reinforced Carbon Black-Containing Resin Composition

| | Crystalline Thermoplastic Resin | | Glass Fiber | | | Pigment | | | | |
|---|---|---|---|---|---|---|---|---|---|---|
| | | | Average Lgth. in Pellet (mm) | Glass Fiber MB Amt. (wt %) | Amt. Blended (wt %) | Pigment MB | | Carbon Black | | |
| Ex. No. | Kind | Amt. (wt %) | | | | MB No. | Pigment Used wt % | Amt. Blended wt % | Av.Aggregate Size on Prim. Cohesion (nm) | |
| 1 | PP | 79.5 | 6.0 | 25 | 20 | 1 | 2.0 | 0.5 | 44 | |
| 2 | PP | 79.5 | 6.0 | 25 | 20 | 2 | 2.0 | 0.5 | 50 | |
| 3 | PP | 79.5 | 6.0 | 25 | 20 | 3 | 2.0 | 0.5 | 58 | |
| 1* | PP | 79.5 | 6.0 | 25 | 20 | 4 | 2.0 | 0.5 | 78 | |
| 2* | PP | 79.5 | 6.0 | 25 | 20 | 5 | 2.0 | 0.5 | 248 | |
| 4 | PP | 77.0 | 6.0 | 25 | 20 | 12 | 6.0 | 3.0 | 44 | |
| 5 | PP | 75.0 | 6.0 | 25 | 20 | 12 | 10.0 | 5.0 | 44 | |
| 3* | PP | 70.0 | 6.0 | 25 | 20 | 12 | 20.0 | 10.0 | 44 | |
| 6 | PP | 79.5 | 6.0 | 25 | 20 | 6 | 2.0 | 0.5 | 46 | |
| 4* | PP | 79.5 | 6.0 | 25 | 20 | 7 | 2.0 | 0.5 | 46 | |
| 7 | PP | 69.5 | 0.5 | — | 30 | — | — | 0.5 | 44 | |
| 5* | PP | 69.5 | 0.3 | — | 30 | — | — | 0.5 | 78 | |

| | Pigment | | | | | Quality Evaluation | | |
|---|---|---|---|---|---|---|---|---|
| | Carbon Black | | | | | Retention Rate (%) | | |
| Ex. No. | Av. Particle Size (nm) | Dispersibility | TiO$_2$ Amt. wt % | ZnS Amt. wt % | Color Tone | Tensile Strength | Flexural Strength | Izod Impact Strength (notched) |
| 1 | 16 | ○ | — | — | black | 98 | 97 | 99 |
| 2 | 24 | ○ | — | — | black | 96 | 95 | 92 |
| 3 | 24 | ○ | — | — | black | 96 | 88 | 85 |
| 1* | 24 | ○ | — | — | black | 85 | 87 | 74 |
| 2* | 84 | ○ | — | — | black | 77 | 73 | 52 |
| 4 | 16 | ○ | — | — | black | 97 | 97 | 95 |
| 5 | 16 | ○ | — | — | black | 94 | 89 | 90 |
| 3* | 16 | X | — | — | black | 91 | 86 | 69 |
| 6 | 18 | ○ | — | — | black | 94 | 92 | 93 |
| 4* | 18 | X | — | — | black | 83 | 84 | 74 |
| 7 | 16 | ○ | — | — | black | 99 | 99 | 99 |
| 5* | 24 | ○ | — | — | black | 88 | 88 | 78 |

*: Comparative Example

Examples 8 to 11

The same procedures used in Example 7 were repeated except that thermoplastic resins listed in Table 3 were used and that the amounts of the glass fibers used were changed to 30% by weight to form test pieces.

More specifically, there were used, as the thermoplastic resins, polyamide-6 (PA-6) in Example 8, polycarbonate (PC) in Example 9, an acrylonitrile-styrene copolymer resin in Example 10 and a polymer alloy: PA-6/PP in Example 11.

After conditioning the resulting test pieces in the same manner used in Example 7, physical properties thereof were measured. The results thus obtained are summarized in Table 3.

Comparative Examples 6 to 9

The same procedures used in Comparative Example 5 were repeated except that thermoplastic resins specified in Table 3 were used instead of that used in Comparative Example 5 to give test pieces.

More specifically, there were used, as the thermoplastic resin, polyamide-6 (PA-6) in Comparative Example 6, polycarbonate (PC) in Comparative Example 7, an acrylonitrile-styrene copolymer resin in Comparative Example 8 and a polymer alloy: PA-6/PP in Comparative Example 9.

After conditioning the resulting test pieces in the same manner used in Example 7, physical properties thereof were measured. The results thus obtained are summarized in Table 3.

Example 12

The glass fiber MB, pigment MB and un-modified polypropylene (PP) listed in Table 2 were dry-blended in amounts likewise specified in Table 2 and then each resulting blend was introduced into an injection molder to give test pieces of reinforced composite materials.

The test pieces thus produced were each subjected to conditioning (23° C.×48 hr), then physical properties thereof were measured and the results listed in Table 3 were obtained.

In Example 12, zinc sulfide was used as the pigment in the pigment MB.

After conditioning the resulting test pieces in the same manner used in Example 7, physical properties thereof were determined. The results thus obtained are summarized in Table 3.

Comparative Examples 10 to 12

The same procedures used in Example 12 were repeated except that the pigment MB's listed in Table 3 were used instead of that used in Example 12.

More specifically, there were used carbon black (#900: Pigment MB No. 8) having an average aggregate size upon primary cohesion of 44 nm in Comparative Example 11 and carbon black (#40: Pigment MB No. 9 or 11) having an average aggregate size upon primary cohesion of 78 nm in Comparative Examples 10 and 12.

Zinc sulfide was used as a pigment for the pigment MB in Comparative Example 10, while titanium oxide was used as a pigment for the pigment MB in Comparative Examples 11 and 12.

After conditioning the resulting test pieces in the same manner used in Example 7, physical properties thereof were measured. The results thus obtained are summarized in Table 3.

Examples 13 and 14

The same procedures used in Example 7 were repeated except that fiber reinforcing materials specified in Table 4 were used instead of that used in Example 7 to form test pieces.

More specifically, there were used carbon fibers in Example 13 and Aramid fibers in Example 14.

Test pieces were prepared, followed by conditioning them and determination of physical properties thereof, in the same manner used in Example 7. The results thus obtained are summarized in the following Table 4.

Comparative Examples 13 and 14

The same procedures used in Comparative Example 5 were repeated except that fiber reinforcing materials specified in Table 4 were used instead of that used in Comparative Example 5 to form test pieces.

More specifically, there were used carbon fibers in Comparative Example 13 and Aramid fibers in Comparative Example 14.

TABLE 3

Components and Quality of Glass Fiber-Reinforced Carbon Black-Containing Resin Composition

| Ex. No. | Crystalline Thermoplastic Resin Kind | Amt. (wt %) | Glass Fiber Average Lgth. in Pellet (mm) | Glass Fiber MB Amt. (wt %) | Amt. Blended (wt %) | Pigment MB Pigment MB No. | Pigment MB Amt. Used wt % | Carbon Black Amt. Blended wt % | Carbon Black Av. Aggregate Size on Prim. Cohesion (nm) |
|---|---|---|---|---|---|---|---|---|---|
| 8 | PA6 | 69.5 | 0.5 | — | 30 | — | — | 0.5 | 44 |
| 9 | PC | 69.5 | 0.5 | — | 30 | — | — | 0.5 | 44 |
| 10 | AS | 69.5 | 0.5 | — | 30 | — | — | 0.5 | 44 |
| 11 | PA6/PP | 69.5 | 0.5 | — | 30 | — | — | 0.5 | 44 |
| 6* | PA6 | 69.5 | 0.3 | — | 30 | — | — | 0.5 | 78 |
| 7* | PC | 69.5 | 0.3 | — | 30 | — | — | 0.5 | 78 |
| 8* | AS | 69.5 | 0.3 | — | 30 | — | — | 0.5 | 78 |
| 9* | PA6/PP | 69.5 | 0.3 | — | 30 | — | — | 0.5 | 78 |
| 12 | PP | 79.0 | 6.0 | 25 | 20 | 8 | 2.0 | 0.1 | 44 |
| 10* | PP | 79.0 | 6.0 | 25 | 20 | 9 | 2.0 | 0.1 | 78 |
| 11* | PP | 79.0 | 6.0 | 25 | 20 | 10 | 2.0 | 0.1 | 44 |
| 12* | PP | 79.0 | 6.0 | 25 | 20 | 11 | 2.0 | 0.1 | 78 |

| Ex. No. | Carbon Black Av. Particle Size (nm) | Dispersibility | Pigment TiO$_2$ Amt. wt % | Pigment ZnS Amt. wt % | Color Tone | Tensile Strength Retention Rate (%) | Flexural Strength Retention Rate (%) | Izod Impact Strength (notched) Retention Rate (%) |
|---|---|---|---|---|---|---|---|---|
| 8 | 16 | ○ | — | — | black | 99 | 98 | 98 |
| 9 | 16 | ○ | — | — | black | 98 | 98 | 98 |
| 10 | 16 | ○ | — | — | black | 99 | 99 | 99 |
| 11 | 16 | ○ | — | — | black | 98 | 99 | 99 |
| 6* | 24 | ○ | — | — | black | 88 | 86 | 74 |
| 7* | 24 | ○ | — | — | black | 87 | 86 | 75 |
| 8* | 24 | ○ | — | — | black | 89 | 87 | 73 |
| 9* | 24 | ○ | — | — | black | 86 | 88 | 76 |
| 12 | 16 | ○ | — | 0.9 | gray | 94 | 94 | 90 |
| 10* | 24 | ○ | — | 0.9 | gray | 76 | 77 | 65 |
| 11* | 16 | ○ | 0.9 | — | gray | 75 | 70 | 55 |
| 12* | 24 | ○ | 0.9 | — | gray | 67 | 63 | 40 |

*: Comparative Example

After conditioning the resulting test pieces in the same manner used in Comparative Example 5. physical properties thereof were measured. The results thus obtained are summarized in the following Table 4.

Example 15

The same procedures used in Example 13 were repeated except that the pigment used comprised 0.1% by weight of carbon black (average aggregate size upon primary cohesion: 44 nm) and 0.9% by weight of zinc sulfide and that the amount of the thermoplastic resin used was correspondingly changed to form test pieces.

After conditioning the resulting test pieces in the same manner used in Example 13, physical properties thereof were measured. The results thus obtained are summarized in the following Table 4.

Comparative Examples 15 to 17

The same procedures used in Example 15 were repeated except that pigments specified in Table 4 were used instead of that used in Example 15 to form test pieces.

More specifically, there were used 0.1% carbon black (average aggregate size upon primary cohesion: 78 nm)/0.9% ZnS in Comparative Example 15, 0.1% carbon black (average aggregate size upon primary cohesion: 44 nm)/0.9% titanium oxide in Comparative Example 16 and 0.1% carbon black (average aggregate size upon primary cohesion: 78 nm)/0.9% titanium oxide in Comparative Example 17, respectively.

After conditioning the resulting test pieces in the same manner used in Example 13. physical properties thereof were measured. The results thus obtained are summarized in the following Table 4.

Example 16

The same procedures used in Example 14 were repeated except that the composition of 0.1% carbon black (average aggregate size upon primary cohesion: 44 nm)/0.9% zinc sulfide was used as the pigment and that the amount of the thermoplastic resin used was correspondingly changed to form test pieces.

After conditioning the resulting test pieces in the same manner used in Example 14, physical properties thereof were measured. The results thus obtained are summarized in the following Table 4.

Comparative Examples 18 to 20

The same procedures used in Example 14 were repeated except that pigments specified in Table 4 were used instead of that used in Example 14 to form test pieces.

More specifically, there were used 0.1% carbon black (average aggregate size upon primary cohesion: 78 nm)/0.9% ZnS in Comparative Example 18, 0.1% carbon black (average aggregate size upon primary cohesion: 44 nm)/0.9% titanium oxide in Comparative Example 19 and 0.1% carbon black (average aggregate size upon primary cohesion: 78 nm)/0.9% titanium oxide in Comparative Example 20, respectively.

After conditioning the resulting test pieces in the same manner used in Example 14, physical properties thereof were measured. The results thus obtained are summarized in the following Table 4.

TABLE 4

Components and Quality of Glass Fiber-Reinforced Carbon Black-Containing Resin Composition

| Ex. No. | Crystalline Thermoplastic Resin Kind | Crystalline Thermoplastic Resin Amt. wt % | Kind of Fiber Used | Av. Lgth. in Pellet mm | Fiber MB Amt. wt % | Amt. Blended wt % | Pigment MB No. | Pigment MB Amt. Used wt % | Carbon Black Amt. Blended wt % | Carbon Black Av. Aggregate Size On Prim. Cohesion, nm |
|---|---|---|---|---|---|---|---|---|---|---|
| 13 | PP | 69.5 | C Fiber[1] | 0.5 | — | 30 | — | — | 0.5 | 44 |
| 14 | PP | 69.5 | A Fiber[2] | 0.5 | — | 30 | — | — | 0.5 | 44 |
| 13* | PP | 69.5 | C Fiber[1] | 0.3 | — | 30 | — | — | 0.5 | 78 |
| 14* | PP | 69.5 | A Fiber[2] | 0.3 | — | 30 | — | — | 0.5 | 78 |
| 15 | PP | 69.0 | C Fiber[1] | 0.5 | — | 30 | — | — | 0.1 | 44 |
| 15* | PP | 69.0 | C Fiber[1] | 0.3 | — | 30 | — | — | 0.1 | 78 |
| 16* | PP | 69.0 | C Fiber[1] | 0.3 | — | 30 | — | — | 0.1 | 44 |
| 17* | PP | 69.0 | C Fiber[1] | 0.3 | — | 30 | — | — | 0.1 | 78 |
| 16 | PP | 69.0 | A Fiber[2] | 0.5 | — | 30 | — | — | 0.1 | 44 |
| 18* | PP | 69.0 | A Fiber[2] | 0.3 | — | 30 | — | — | 0.1 | 78 |
| 19* | PP | 69.0 | A Fiber[2] | 0.3 | — | 30 | — | — | 0.1 | 44 |
| 20* | PP | 69.0 | A Fiber[2] | 0.3 | — | 30 | — | — | 0.1 | 78 |

[1]: carbon fiber;
[2]: Aramid fiber.

| Ex. No. | Carbon Black Av. Particle Size (nm) | Dispersibility | $TiO_2$ Amt. wt % | ZnS Amt. wt % | Color Tone | Tensile Strength Retention Rate (%) | Flexural Strength Retention Rate (%) | Izod Impact Strength (notched) Retention Rate (%) |
|---|---|---|---|---|---|---|---|---|
| 13 | 16 | ○ | — | — | black | 96 | 98 | 99 |
| 14 | 16 | ○ | — | — | black | 95 | 95 | 96 |

TABLE 4-continued

| | | | | | | | | |
|---|---|---|---|---|---|---|---|---|
| 13* | 24 | ○ | — | — | black | 79 | 80 | 70 |
| 14* | 24 | ○ | — | — | black | 76 | 76 | 72 |
| 15 | 16 | ○ | — | 0.9 | gray | 90 | 92 | 90 |
| 15* | 24 | ○ | — | 0.9 | gray | 71 | 76 | 62 |
| 16* | 16 | ○ | 0.9 | — | gray | 72 | 75 | 50 |
| 17* | 24 | ○ | 0.9 | — | gray | 62 | 67 | 39 |
| 16 | 16 | ○ | — | 0.9 | gray | 93 | 90 | 93 |
| 18* | 24 | ○ | — | 0.9 | gray | 75 | 72 | 66 |
| 19* | 16 | ○ | 0.9 | — | gray | 74 | 72 | 56 |
| 20* | 24 | ○ | 0.9 | — | gray | 62 | 65 | 38 |

*: Comparative Example

What is claimed is:

1. A fiber-reinforced thermoplastic resin composite material formed from:

a thermoplastic resin;

a fiber reinforcing material; and carbon black, wherein the fiber reinforcing material has an average diameter ranging from 3 to 21 μm and an average length ranging from 0.3 to 30 mm and is included in the composite material in an amount ranging from 5 to 80% by weight on the basis of the weight of the composite material, the carbon black has an aggregate size upon primary cohesion of not more than 60 nm and is included in the composite material in an amount ranging from 0.01 to 5% by weight on the basis of the weight of the composite material, and the fiber-reinforced thermoplastic resin composition material is prepared by kneading the thermoplastic resin, the fiber reinforcing material, and the carbon black.

2. The fiber-reinforced thermoplastic resin composite material as claimed in claim 1, wherein the fiber reinforcing material is fibers produced by forming, into fibers, at least one inorganic substance selected from the group consisting of glass, quartz, naturally-occurring minerals, metals and carbon.

3. The fiber-reinforced thermoplastic resin composite material as claimed in claim 1, wherein the fiber reinforcing material is fibers produced by forming, into fibers, at least one organic substance selected from the group consisting of polyamide resins, polyester resins, aramid resins and polyimide resins.

4. The fiber-reinforced thermoplastic resin composite material as claimed in claim 1, wherein the carbon black has an average particle size ranging from 13 to 24 nm.

5. The fiber-reinforced thermoplastic resin composite material as claimed in any one of claims 1 to 4, wherein the carbon black has an aggregate size upon primary cohesion of not more than 55 nm.

6. A fiber-reinforced thermoplastic resin composite material comprising:

a thermoplastic resin;

a fiber reinforcing material;

carbon black; and zinc sulfide, wherein the fiber reinforcing material has an average diameter ranging from 3 to 21 μm and an average length ranging from 0.3 to 30 mm and is included in the composite material in an amount ranging from 5 to 80% by weight on the basis of the weight of the composite material, the carbon black has an aggregate size upon primary cohesion of not more than 60 nm and is included in the composite material in an amount ranging from 0.025 to 0.4% by weight on the basis of the weight of the composite material, the zinc sulfide is in an amount ranging from 0.45 to 2.0% by weight based on the weight of the composite material, and the fiber-reinforced thermoplastic resin composition material is prepared by kneading the thermoplastic resin, the fiber reinforcing material, the carbon black, and the zinc sulfide.

7. The fiber-reinforced thermoplastic resin composite material as claimed in claim 6, wherein the fiber reinforcing material is fibers produced by forming, into fibers, at least one inorganic substance selected from the group consisting of glass, quartz, naturally-occurring minerals, metals and carbon.

8. The fiber-reinforced thermoplastic resin composite material as claimed in claim 6, wherein the fiber reinforcing material is fibers produced by forming, into fibers, at least one organic substance selected from the group consisting of polyamide resins, polyester resins, aramid resins and polyimide resins.

9. The fiber-reinforced thermoplastic resin composite material as claimed in claim 6, wherein the carbon black has an average particle size ranging from 13 to 24 nm.

10. The fiber-reinforced thermoplastic resin composite material as claimed in claim 6, wherein the carbon black has an aggregate size upon primary cohesion of not more than 55 nm.

11. The fiber-reinforced thermoplastic resin composite material as claimed in claim 3 wherein the average diameter of the fiber reinforcing material is 6 to 16 μm.

12. The fiber-reinforced thermoplastic resin composition material as claimed in claim 1 wherein the content of the fiber reinforcing material ranges, by weight, based on the total weight of the composite from 15% to 40%.

* * * * *